(12) United States Patent
Watanabe et al.

(10) Patent No.: US 9,292,947 B2
(45) Date of Patent: Mar. 22, 2016

(54) IMAGE PROCESSING APPARATUS AND AN IMAGE PROCESSING METHOD FOR GENERATING MOSAIC IMAGE(S)

(75) Inventors: Kazuhiro Watanabe, Tokyo (JP);
Wataru Kaku, Yokohama (JP);
Hiroyuki Fukushima, Mitaka (JP);
Kaori Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/537,797

(22) Filed: Jun. 29, 2012

(65) Prior Publication Data

US 2013/0002699 A1 Jan. 3, 2013

(30) Foreign Application Priority Data

Jul. 1, 2011 (JP) .................. 2011-147406

(51) Int. Cl.
*G06T 11/40* (2006.01)
(52) U.S. Cl.
CPC ...................... *G06T 11/40* (2013.01)
(58) Field of Classification Search
USPC ......................................................... 345/589
See application file for complete search history.

(56) References Cited

U.S. PATENT DOCUMENTS

| 6,542,638 | B2 * | 4/2003 | Campbell ..................... 382/201 |
| 2009/0154762 | A1 * | 6/2009 | Choi et al. ..................... 382/100 |
| 2009/0273613 | A1 * | 11/2009 | Subherwal et al. ............ 345/634 |
| 2012/0110491 | A1 * | 5/2012 | Cheung ......................... 715/771 |

FOREIGN PATENT DOCUMENTS

| JP | 2007-279776 A | 10/2007 |
| JP | 2008-059122 A | 3/2008 |
| JP | 2009-171158 A | 7/2009 |
| JP | 2009-194550 A | 8/2009 |
| JP | 2010-231445 A | 10/2010 |
| JP | 2011-54080 A | 3/2011 |
| JP | 2011-78078 A | 4/2011 |

OTHER PUBLICATIONS

Kim, Junhwan, and Fabio, Pellacini, Jigsaw Image Mosaics, ACM Transactions on Graphics 21.3 (2002).*
Battiato, Sebastiano, et al., A Survey of Digital Mosaic Techniques, Eurographics Italian Chapter Conference. 2006.*

* cited by examiner

*Primary Examiner* — Barry Drennan
*Assistant Examiner* — Richard M Russell
(74) *Attorney, Agent, or Firm* — Canon USA, Inc. IP Division

(57) ABSTRACT

To generate a high-quality mosaic image even in a case where a material image having a shape different from that of a region in which the material image is to be placed is used. A target image is divided into a plurality of different-sized regions. The size of a material image is changed in accordance with the area of corresponding one of the regions, and is placed in the region on the basis of the chromatic component of the region. In the case of overlapping material images that have been placed, control processing is performed so that a smaller one of them is placed on a larger one of them.

20 Claims, 5 Drawing Sheets

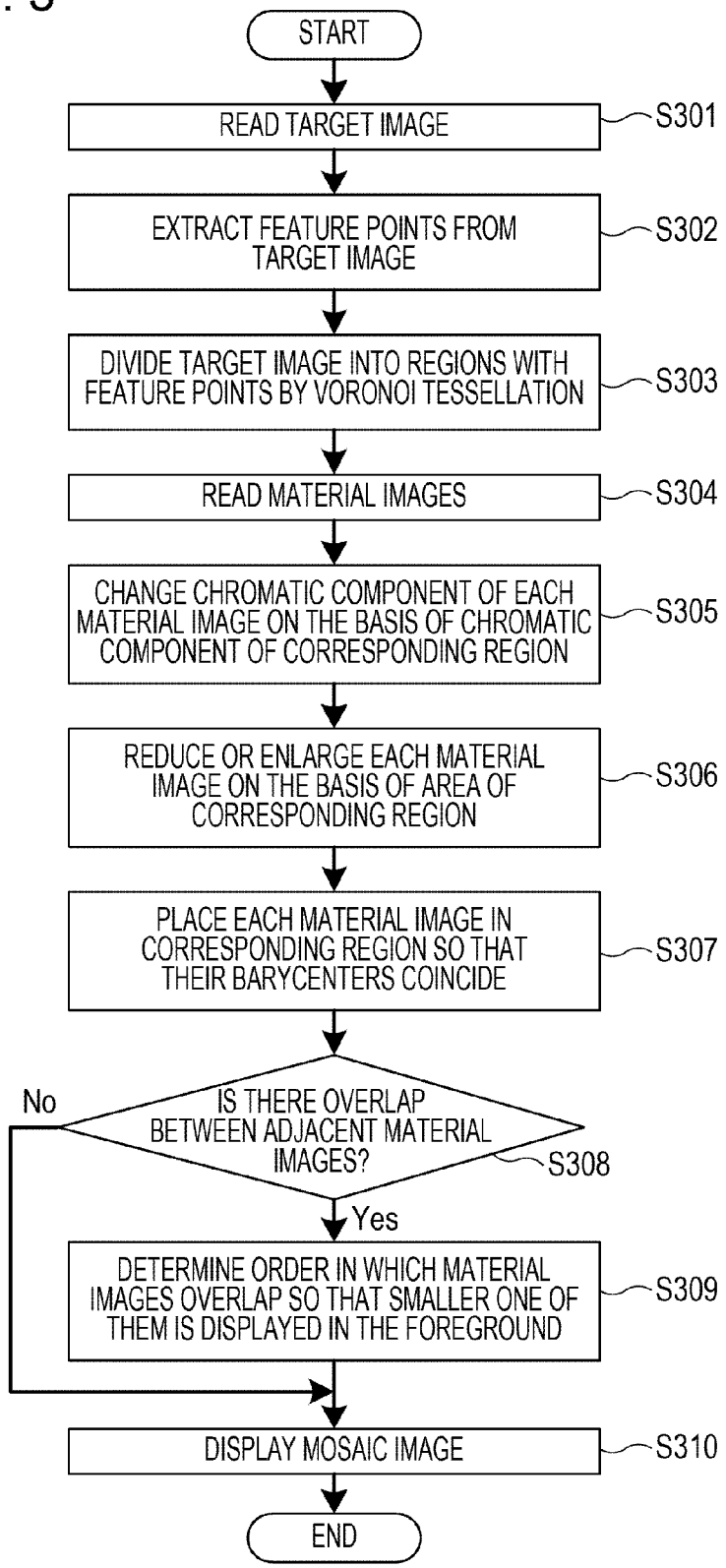

IMAGE PROCESSING APPARATUS AND AN IMAGE PROCESSING METHOD FOR GENERATING MOSAIC IMAGE(S)

BACKGROUND OF THE INVENTION

1. Field of the Invention

The present invention relates to an image processing apparatus and an image processing method, and, more particularly, to a technique suitable for generating a high-quality mosaic image even in a case where material images having shapes different from those of corresponding regions are used.

2. Description of the Related Art

A photo mosaic method of dividing a single target image into a plurality of regions and replacing the regions with different images (material images) having similar colors is known (Japanese Patent Laid-Open No. 2009-171158). The photo mosaic method is used for corporate advertising in which a single poster is created with images brought by a plurality of users.

In a case where the mosaic image generation apparatus disclosed in Japanese Patent Laid-Open No. 2009-171158 is used, material images are neatly arranged in regions having the same size. Accordingly, a viewer may not notice that a resultant image is a mosaic image or may have a monotonous feeling about the mosaic image. Japanese Patent Laid-Open No. 2011-78078 discloses an image processing apparatus and a mosaic image generation method with which the sizes of regions, into which an image has been divided, are individually changed in accordance with details of the image and the texture of a characteristic part of the image can be represented in detail. Japanese Patent Laid-Open No. 2011-54080 discloses an image processing apparatus that can obtain a high-quality photo mosaic image by dividing an image into regions having shapes other than a rectangular shape.

However, since the image processing apparatuses disclosed in Japanese Patent Laid-Open Nos. 2011-78078 and 2011-54080 arrange material images in regions to generate a mosaic image, they cannot arrange material images having shapes different from those of the regions without changing the shapes of the material images. Accordingly, it is impossible to generate a high-quality mosaic image with material images whose shapes have an important meaning (for example with only portraits cut out from snapshots).

SUMMARY OF THE INVENTION

It is an object of the present invention to generate a high-quality mosaic image even in a case where material images having shapes different from those of corresponding material image placement regions, into which an image has been divided, are used.

According to the first aspect of the present invention, there is provided an image processing apparatus including region dividing means configured to divide a target image into a plurality of different-sized regions, size changing means configured to change a size of a material image in accordance with an area of corresponding one of the regions obtained by the region dividing means, material image placing means configured to place the material image whose size has been changed in the region on the basis of a chromatic component of the region, and controlling means configured to perform control processing so that a smaller one of overlapping material images placed by the material image placing means is placed on a larger one of the overlapping material images.

According to the present invention, it is possible to generate a high-quality mosaic image even in a case where material images having shapes different from those of corresponding regions, into which an image has been divided, are used.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

FIG. 3 is a flowchart describing a process performed by an image processing apparatus.

DESCRIPTION OF THE EMBODIMENTS

Exemplary embodiments of the present invention will be described in detail below with reference to the accompanying drawings.

It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

First Embodiment

Figure 1:
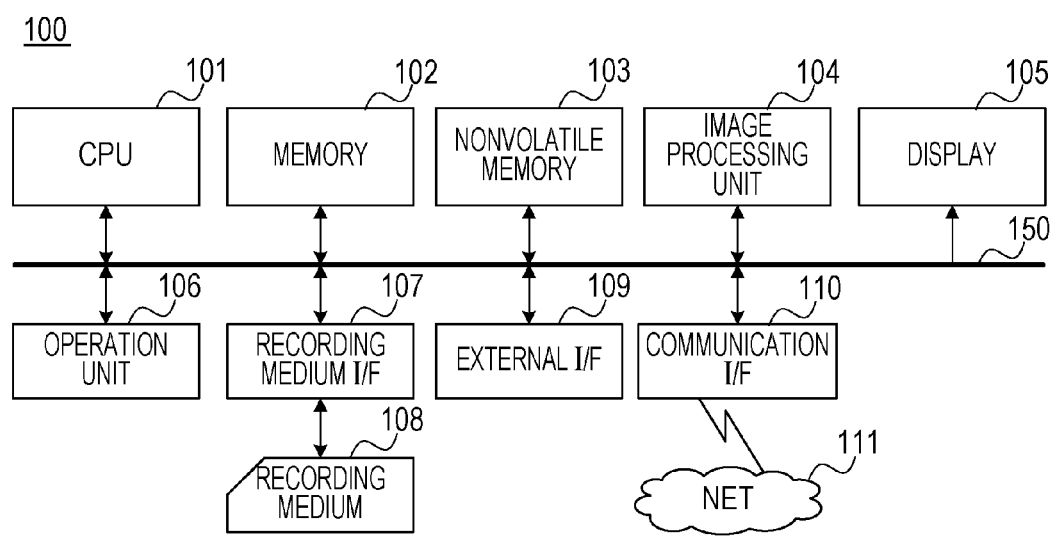
FIG. 1 is a block diagram of an image processing apparatus according to a first embodiment of the present invention.

The first embodiment of the present invention will be described below with reference to the accompanying drawings. FIG. 1 is a block diagram illustrating an exemplary configuration of an image processing apparatus 100 to which the present invention can be applied. The image processing apparatus 100 is, for example, a personal computer (hereinafter referred to as a PC).

Referring to FIG. 1, a CPU 101, a memory 102, a nonvolatile memory 103, an image processing unit 104, a display 105, an operation unit 106, a recording medium I/F 107, an external I/F 109, and a communication I/F 110 are connected to an internal bus 150. The exchange of data can be performed via the internal bus 150 among the units connected to the internal bus 150.

The CPU 101 uses the memory 102 as a work memory and controls each unit in the image processing apparatus 100 in accordance with a program stored in, for example, the nonvolatile memory 103. The memory 102 is, for example, a RAM (a volatile memory using a semiconductor element). Various pieces of data including image data and sound data and various programs used for the operation of the CPU 101 are stored in the nonvolatile memory 103. The nonvolatile memory 103 is, for example, a hard disk (HD) or a ROM.

The image processing unit 104 performs various pieces of image processing on image data stored in the nonvolatile memory 103 or the recording medium 108, a video signal acquired via the external I/F 109, and image data acquired via the communication I/F 110 under the control of the CPU 101. The pieces of image processing performed by the image processing unit 104 include A/D conversion processing, D/A conversion processing, image data coding processing, compression processing, decoding processing, enlarging/reduction (resizing) processing, noise reduction processing, chromatic component analysis processing, color conversion processing, feature point extraction processing, image placement processing, and overlap order control processing. The image processing unit 104 may be formed of dedicated circuit blocks for performing specific image processing. Some type of image processing can be performed not by the image processing unit 104 but by the CPU 101 in accordance with a program.

The display 105 displays an image and a GUI screen forming a GUI (Graphical User Interface) under the control of the CPU 101. The CPU 101 generates a display control signal in accordance with a program, and controls each unit in the image processing apparatus 100 so that a video signal to be displayed on the display 105 is generated and is output to the display 105. The display 105 displays a video image on the basis of the received video signal. The image processing apparatus 100 does not necessarily have to include the display 105, and the display 105 may be an external monitor (television). In this case, the image processing apparatus 100 includes an interface for outputting a video signal to be displayed on the external monitor.

The operation unit 106 includes a character information input device such as a keyboard and a user's operation input device such as a pointing device (a mouth or a touch panel), a button, a dial, a joystick, a touch sensor, or a touch pad. A touch panel is a planar input device overlaid on the display 105 and is configured to output coordinate information corresponding to a touched position.

The recording medium I/F 107 to which the recording medium 108 such as a memory card, a CD, or a DVD can be attached reads data from the recording medium 108 attached thereto or writes data in the recording medium 108 under the control of the CPU 101. The external I/F 109 is an interface connected to an external apparatus with a wired cable or a wireless method. The communication I/F 110 is an interface that communicates with an external apparatus or the Internet 111 so as to transmit or receive various pieces of data including a file and a command.

A mosaic image generation process performed by the image processing apparatus 100 according to this embodiment will be described with reference to FIGS. 2A to 2D. A mosaic image includes a plurality of small images serving as elements (hereinafter referred to as material images) that are arranged to allow a viewer to recognize the mosaic image as a single large image (hereinafter referred to as a target image). Accordingly, a viewer can visually recognize a mosaic image as a single large image (target image) when looking at the whole of the mosaic image and can visually recognize each of the material images serving as elements when looking at the mosaic image in detail at close range.

Figure 2A:
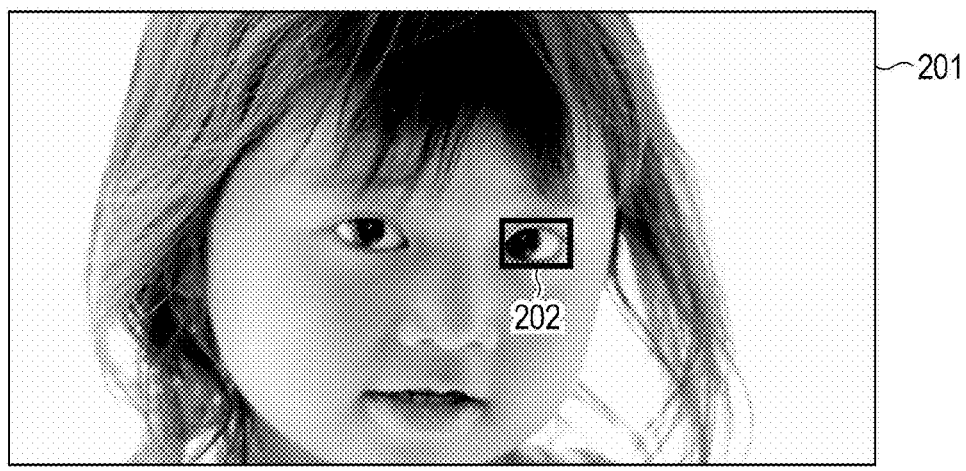
FIGS. 2A to 2D are diagrams describing a mosaic image generation process performed by an image processing apparatus.

Referring to FIG. 2A, a target image 201 to be a mosaic image and a frame 202 surrounding a part of the target image are illustrated. First, the image processing apparatus 100 divides the target image 201 into regions. As a method for the regional division, a drawing method of finely dividing a characteristic part of an image and roughly dividing the other part to improve the finish quality of a generated mosaic image is known.

For example, at the time of generation of a mosaic image from a portrait that is a target image, in a case where a characteristic part (a human eye) of the target image becomes a single region and a material image is placed in the region, it is difficult to recognize that the part in the generated mosaic image is a human eye. It is therefore necessary to divide the target image in accordance with the details of the target image, that is, finely divide a characteristic part of the target image and roughly divide the other part. The image processing apparatus 100 according to this embodiment extracts feature points from an image so as to appropriately divide a characteristic part of the image where the details of the image are changed into regions, and then divides the image into regions on the basis of the extracted feature points.

A feature point extraction method will be described below. In generating a mosaic image, a material image to be placed in corresponding one of regions into which an image has been divided needs to have a color similar to that of the region. Accordingly, it is rational to determine a characteristic part on the basis of the change in the chromatic component of a target image. The image processing unit 104 acquires the chromatic component of each pixel in the target image 201, compares the chromatic components of adjacent pixels, calculates the amount of change in a chromatic component, and extracts a pixel for which the amount of change equal to or larger than a threshold value has been detected as a feature point.

The above-described processing for extracting a feature point does not necessarily have to be performed in units of pixels, and may be performed in units of pixel blocks each including 10×10 pixels. The generation of a mosaic image is not performed by placing a material image at each pixel. Therefore, by grouping pixels as a single pixel block within a range in which the finish quality of a mosaic image is not degraded and performing the feature point extraction processing on each pixel block, a computation load on the CPU 101 can be reduced.

Figure 2B:
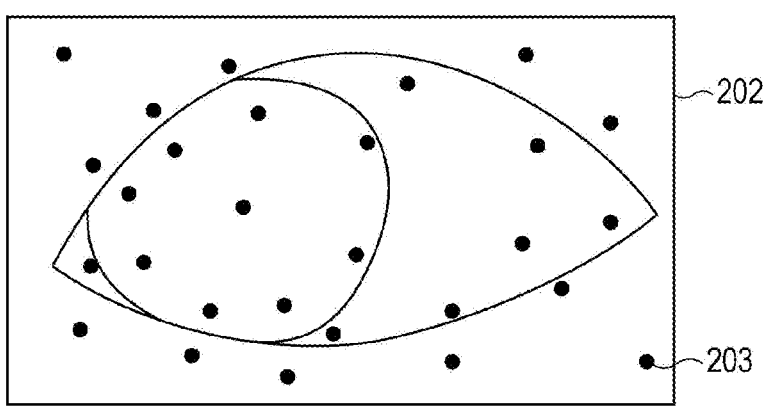

FIG. 2B is an enlarged view of a region surrounded by the frame 202 in FIG. 2A. The region includes feature points 203 obtained by the above-described feature point extraction processing.

Figure 2C:
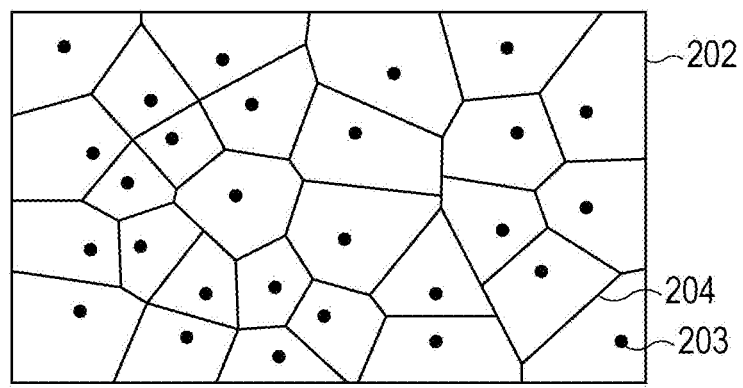

FIG. 2C illustrates dividing lines 204 obtained when the feature points 203 illustrated in FIG. 2B are used as generatrices and regional division is performed by Voronoi tessellation. Voronoi tessellation is a method of performing regional division by determining which of a plurality of points (generatrices) is close to a certain point in the same plane and setting a perpendicular bisector of a line connecting adjacent generatrices as a dividing line.

Feature points and regional division lines are illustrated in FIGS. 2B and 2C for the description of a process, but are not necessarily displayed on a display unit (the display 105) as an image.

Figure 2D:
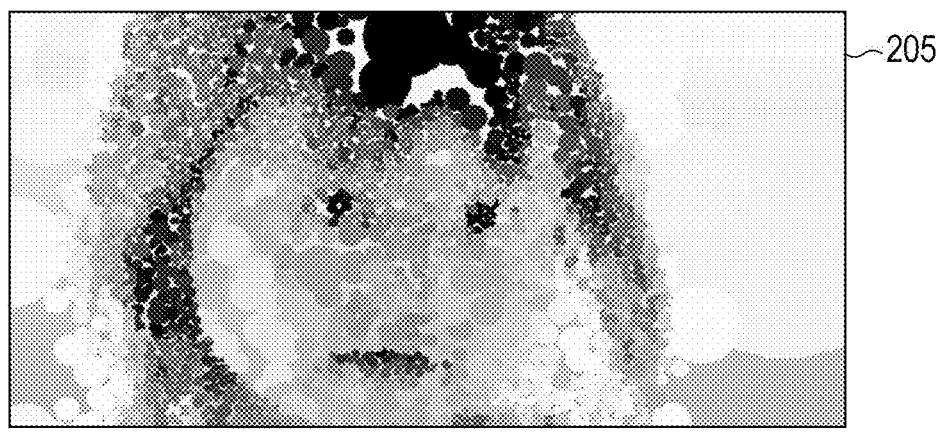

Referring to FIG. 2D, a mosaic image 205 is illustrated which is obtained by using round objects as material images and performing mosaic imaging processing on the target image 201 illustrated in FIG. 2A.

The mosaic imaging processing will be described below. In the mosaic imaging processing, material images are individually placed in regions into which a target image has been divided. Before placing the material images, the color of each material image is converted in accordance with the chromatic component of corresponding one of the regions of the target image. More specifically, a chromatic component average value is calculated for each of the regions of the target image, and a material image is subjected to color conversion so that the color of the material image has a value equal to the average value. In a case where there are a plurality of material images having different colors, one of the material images whose color is close to the chromatic component of one of regions of a target image may be selected, be subjected to color conversion (or not be subjected to color conversion), and be placed in the region.

In addition, before placing the material images, the sizes of the material images are changed. More specifically, the area of each of the regions of the target image is calculated, and corresponding one of the material images is changed so that the area of the material image is equal to the calculated area. The placement of a material image in each of the regions of the target image is performed so that the barycenter of the material image, which has been subjected to size change, coincides with the barycenter of the region.

Here, the "barycenter" represents the center position of distribution of masses equally given to pixels arranged at regular intervals in an irregular region. Since the shape of each region of the target image and the shape of the material images differ from each other, there is an overlap between adjacent material images when the material images are individually placed in the regions without being changed in shape. It is therefore necessary to determine a material image overlap order.

In this embodiment, the material image overlap order is determined so that a material image having a smaller area is displayed in front of a material image having a larger area. As a result of this determination, it is possible to prevent the occurrence of a situation in which a viewer cannot visually check the material image having a smaller area hidden behind the adjacent material image having a larger area.

FIG. 3 is a flowchart illustrating a mosaic imaging process performed by the image processing apparatus 100 according to this embodiment. Each piece of processing in the flowchart is performed by causing the CPU 101 to decompress various programs, which are stored in the nonvolatile memory 103, in the memory 102 and execute them.

First, the image processing apparatus 100 reads the target image 201 from the recording medium 108 and transmits it to the image processing unit 104 (S301). The image processing unit 104 compares the chromatic components of adjacent pixels in the target image 201 and extracts a pixel for which the amount of change in a chromatic component equal to or larger than a threshold value has been detected as a feature point (S302). Subsequently, regional division is performed by Voronoi tessellation in which the feature points extracted in S302 are used as generatrices (S303).

The CPU 101 reads material images from the recording medium 108 and transmits them to the image processing unit 104 (S304). The image processing unit 104 calculates a chromatic component average value for each of regions obtained by the regional division, and converts the chromatic component of corresponding one of the material images so that the chromatic component is equal to the average value (S305). In addition, the image processing unit 104 calculates the area of each of the regions, and changes the size of corresponding one of the material images to be placed in the region so that the areas of the region and the material image are equal to each other (S306).

The image processing unit 104 places the material image in the region so that the barycenters of the material image and the region coincide with each other (S307). Subsequently, the image processing unit 104 determines whether there is an overlap between adjacent material images that have been placed (S308). In a case where it is determined that there is an overlap, the process proceeds to S309. In a case where it is determined in S308 that there is no overlap between adjacent material images, the process proceeds to S310.

The image processing unit 104 determines an overlap order so that one of the material images having a smaller area is displayed in front of the other one of the material images (S309). Subsequently, the image processing unit 104 performs control processing so that a generated mosaic image is displayed on the display 105, and the determination process ends (S310).

As described previously, the extraction of feature points is performed on the basis of the change in a chromatic component in a target image, and regional division in which the feature points are used as generatrices is performed. As a result, the regional division can be appropriately performed in accordance with details of the target image, and a high-quality mosaic image can be obtained.

In addition, even in a case where each material image used has a shape different from the shape of a corresponding region, since an overlap order is determined so that a smaller material image is displayed in the foreground, a high-quality mosaic image can be obtained.

An exemplary regional division method of extracting feature points from a target image and performing Voronoi tessellation with the extracted feature points has been described in S302 and S303. However, another division method of dividing a target image into a plurality of different-sized regions may be performed. Even in a case where the other division method is performed, the process from S304 is not changed. In a case where a target image is divided into a plurality of different-sized regions, it is necessary to adjust the size of each material image in accordance with the size of corresponding one of the regions. Accordingly, the areas of the material images used differ from one another. For this reason, an overlap order is determined so that a material image with a smaller area is displayed in the foreground as described previously.

The mosaic image obtained after S309 does not necessarily have to be displayed on the display 105, and may be output in another manner. For example, the mosaic image may be printed on a recording medium such as a piece of paper by a print unit (not illustrated).

In this embodiment, an exemplary case in which material images of one type are used to generate a mosaic image has been described. However, a plurality of different types of objects or a plurality of objects having different shapes can be used as material images. A photograph or image data read by a scanner or the like can be used as a material image. In the above-described exemplary case, a target image and material images are stored in the recording medium 108, but may be stored in the nonvolatile memory 103. Alternatively, an image on the Internet may be obtained via the communication I/F 110 and be used as a target image or a material image.

A material image overlap order can be determined on the basis of details of an image. For example, in a case where a target image is the snapshot of a person, control processing is performed so that a material image to be placed at the position of the person, who is a subject, is displayed in the foreground. As a result, a mosaic image in which an important part is expressed in detail can be obtained.

Second Embodiment

In a case where a single large mosaic image is generated with many small material images, a mosaic image can be generated with a high degree of definition and can more closely resemble a target image. On the other hand, a viewer may not recognize that the generated image is a mosaic image and may not be interested in the generated image. The second embodiment capable of solving this problem will be described.

In the second embodiment, material images moving in different directions are displayed in a mosaic image (animation is performed). As a result, each of the material images has a presence and a viewer can easily recognize that the mosaic image includes the group of the material images. That is, a mosaic image of a single still image that is a target image is displayed on a display screen as a moving image.

An image processing apparatus according to the second embodiment of the present invention displays each material image while moving it within a predetermined range from the barycenter of the material image. The configuration of an image processing apparatus according to this embodiment is similar to that of an image processing apparatus according to the first embodiment illustrated in FIG. 1, and the description thereof will be therefore omitted.

Figure 4:
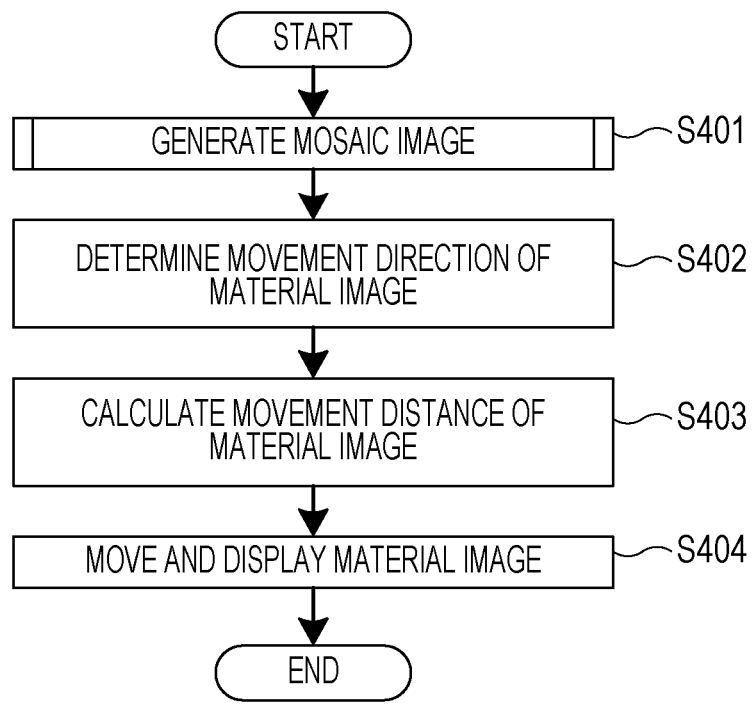
FIG. 4 is a flowchart describing a display process according to a second embodiment.

FIG. 4 is a flowchart illustrating a process of displaying each material image while moving the material image which is performed by the image processing apparatus 100 according to the second embodiment of the present invention.

The image processing apparatus 100 generates a mosaic image (S401). The subroutine of the mosaic image generation illustrated in S401 is the same as that illustrated in FIG. 3, and the description thereof will be therefore omitted.

The image processing unit 104 determines the movement direction of each material image (S402). When overlapping material images move in different directions, the overlap between them is reduced. Accordingly, control processing for moving material images that overlap each other in different directions is performed. The image processing unit 104 performs control processing on the basis of the overlap order determined in S309 illustrated in FIG. 3 so that movement directions are alternately different. It is assumed that material images $L_1, L_2, \ldots,$ and $L_n$ are arranged in this order starting from a material image displayed in the foreground. In a case where a material image $L_{2m+1}$ is moved upward, control processing is performed so that a material image $L_{2m}$ is moved downward.

The image processing unit 104 calculates the distance between the barycenters extracted in S307 in FIG. 3 and determines a movement distance D of each material image on the basis of a result of the calculation (S403). For example, under the assumption that the shortest distance between barycenters is $D_{min}$, the movement distance is determined so that $0<D<D_{min}$ is satisfied. The reason for this determination is that a change of places between material images occurs when the movement distance exceeds $D_{min}$ and a mosaic image is not recognized.

The image processing unit 104 displays each material image while moving it in the direction determined in S402 by the movement distance determined in S403 (S404). That is, control processing is performed so that the material image $L_{2m}$ is moved downward from its barycenter by the movement distance D when the material image $L_{2m+1}$ is moved upward from its barycenter by the movement distance D and then each of them is moved in an opposite direction. A movement method is not limited to the linear movement (for example upward movement and downward movement), and may be rotational movement or random movement.

As described previously, according to the second embodiment of the present invention, control processing is performed so that each material image is moved within a predetermined range. As a result, an effect of allowing a viewer to recognize a mosaic image and attracting the interest of the viewer can be produced.

Furthermore, since overlapping material images move in opposite directions, an effect of reducing an overlap between them and allowing a viewer to recognize hidden parts of the material images can be produced. In particular, since a movement distance is set so that it is within the shortest distance between barycenters, an effect of preventing the occurrence of a change of places between material images at the time of movement of the material images and allowing a viewer to recognize a mosaic image while displaying a natural target image.

In the above-described embodiments, an exemplary case in which the present invention is applied to a personal computer has been described. However, the present invention is not limited to the exemplary case. That is, the present invention may be applied to an image pickup apparatus such as a digital camera. That is, the present invention can also be applied to a case in which a captured image recorded in a digital-camera-readable recording medium such as a memory card is displayed on a display screen such as a rear-panel liquid crystal device provided in a digital camera.

In addition, the present invention can be applied to an apparatus capable of displaying an image, such as a PDA, a mobile telephone, a mobile image viewer, a printer with a display screen, a digital photo frame, a music player, a game machine, or an electronic book reader. The first embodiment in which a mosaic image does not necessarily have to be displayed and may be output in another manner can be implemented in, for example, a printing apparatus that cannot display an image.

Other Embodiments

The present invention can also be realized in such a manner that software (a program) for implementing the function of the above-described embodiments is supplied to a system or an apparatus via a network or from a storage medium of various types storing the program and a computer (or a CPU or MPU) of the system or apparatus reads out and executes the program.

The present invention is not limited to the above-described embodiments. The above-described embodiments can be variously changed and modified without departing from the spirit and scope of the present invention. Accordingly, in order to reveal the scope of the present invention, the following claims are provided.

This application claims the benefit of Japanese Patent Application No. 2011-147406, filed Jul. 1, 2011 which is hereby incorporated by reference herein in its entirety.

What is claimed is:

1. An image processing apparatus comprising:
at least one processor that operates to:
   extract feature points of a target image by comparing chromatic components of adjacent pixel blocks and setting a pixel block for which an amount of change equal to or larger than a threshold value has been detected as a feature point;
   divide the target image into a plurality of different-sized regions on a basis of the feature points;
   change a size of at least one material image in accordance with an area of a corresponding one of the regions obtained by dividing the target image;
   place the at least one material image whose size has been changed in the region on a basis of a chromatic component of the region;
   determine, in a case where the at least one placed material image comprises a plurality of placed material images and where there is an overlap between the placed material images, an overlap order for outputting the overlapping material images, based on an area of each of the overlapping material images; and output the material images in the determined overlap order,
wherein each material image has a shape different from a shape of the respective corresponding region into which the material image is placed, and
wherein at least one of: (i) the feature points comprise a plurality of discrete points spaced away from each other; and (ii) the feature points are not connected to each other.

2. The image processing apparatus according to claim 1, wherein when the at least one processor divides the target image, the target image is divided on the basis of the feature points with a regional division method in which the feature points are used as generatrices.

3. The image processing apparatus according to claim 2, wherein the regional division method is Voronoi tessellation.

4. The image processing apparatus according to claim 1, wherein when the at least one processor changes the size of the at least one material image, the at least one material image changes the size while maintaining the shape.

5. The image processing apparatus according to claim 1, wherein, when the at least one processor extracts the feature points by comparing chromatic components of adjacent pixel blocks, the at least one processor further operates to generate a mosaic image by not placing the at least one material images at each pixel.

6. The image processing apparatus according to claim 1, wherein:
(i) a computation load on the at least one processor is reduced by using the pixel blocks as compared to when the pixel blocks are not used; and
(ii) a computation load on the at least one processor is reduced by using the pixel blocks as compared to when the pixels are used.

7. The image processing apparatus according to claim 1, wherein the at least one processor further operates to:
(i) calculate a chromatic component average value for each of the regions of the target image; and
(ii) perform color conversion on each of the at least one material image for the corresponding region of the regions so that the color of the material image of the at least one material image has a value equal to the average value for the corresponding region.

8. The image processing apparatus according to claim 1, wherein the at least one material image comprises at least one of: a plurality of different types of objects and a plurality of objects having different shapes from each other.

9. The image processing apparatus according to claim 1, further comprising a recording medium, wherein the at least one material image and the target image are stored in the recording medium of the image processing apparatus.

10. The image processing apparatus according to claim 1, wherein at least one barycenter of the at least one material image is a center position of distribution of masses equally given to pixels arranged at regular intervals in an irregular region of the regions.

11. An image processing apparatus comprising:
at least one processor that operates to:
extract feature points of a target image;
divide the target image into regions on a basis of the feature points;
change a size of at least one material image in accordance with an area of a corresponding one of the regions obtained by dividing the target image;
place the at least one material image whose size has been changed in the region on a basis of a chromatic component of the region;

determine, in a case where the at least one placed material image comprises a plurality of placed material images and where there is an overlap between the placed material images, an overlap order for outputting the overlapping material images, based on an area of each of the overlapping material images; and
perform control processing so that the at least one material image is displayed while being moved within a predetermined range from a barycenter of the at least one material image and so that at least two of the overlapping material images move in different directions from each other.

12. The image processing apparatus according to claim 11, wherein at least one of:
(i) the control processing is performed so that the at least two of the overlapping material images, for which the overlap order has been determined, move in different directions from each other;
(ii) the at least two of the overlapping material images move in different directions from each other so that the amount of overlap is reduced compared to when the at least two of the overlapping material images are not moving in different directions from each other;
(iii) the at least two of the overlapping material images move in different directions away from each other;
(iv) the control processing is performed so that the at least two of the overlapping material images that are moved in different directions from each other are selected based on the overlap order; and
(v) the control processing is performed so that the at least two of the overlapping material images that are moved in different directions from each other are selected based on the overlap order and so that the moving directions of the selected, overlapping material images are alternately different from each other.

13. The image processing apparatus according to claim 11, wherein the control processing is performed so that the at least one material image moves within the shortest distance between barycenters of the at least one material image and of the respective corresponding region into which the at least one material image is placed.

14. The image processing apparatus according to claim 13, wherein the barycenter of each of the at least one material image coincides with the barycenter of the respective, corresponding region into which the at least one material image is placed.

15. An image processing method for controlling an imaging apparatus having at least one processor, the method comprising:
extracting, via the at least one processor, feature points of a target image by comparing chromatic components of adjacent pixel blocks and setting a pixel block for which an amount of change equal to or larger than a threshold value has been detected as a feature point;
dividing, via the at least one processor, the target image into a plurality of different-sized regions on a basis of the feature points;
changing, via the at least one processor, a size of at least one material image in accordance with an area of a corresponding one of the regions obtained in the dividing step;
placing, via the at least one processor, the at least one material image whose size has been changed in the region, obtained in the dividing step, on a basis of a chromatic component of the region;
determining, via the at least one processor, in a case where the at least one placed material image comprises a plurality of placed material images and where there is an overlap between the placed material images, an overlap order for outputting the overlapping material images, based on an area of each of the overlapping material images; and outputting, via the at least one processor, the material images in the determined overlap order, wherein each material image has a shape different from a shape of the respective corresponding region into which the material image is placed, and wherein at least one of: (i) the feature points comprise a plurality of discrete points spaced away from each other; and (ii) the feature points are not connected to each other.

16. The image processing method according to claim 15, wherein the target image is divided on the basis of the feature points with a regional division method in which the feature points are used as generatrices, the regional division method being Voronoi tessellation.

17. An image processing method for controlling an imaging apparatus having at least one processor, the method comprising:

extracting, via the at least one processor, feature points of a target image;

dividing, via the at least one processor, the target image into regions on a basis of the feature points;

changing, via the at least one processor, a size of at least one material image in accordance with an area of a corresponding one of the regions obtained in the dividing step;

placing, via the at least one processor, the at least one material image whose size has been changed in the region, obtained in the dividing step, on a basis of a chromatic component of the region;

determining, via the at least one processor, in a case where the at least one placed material image comprises a plurality of placed material images and where there is an overlap between the placed material images, an overlap order for outputting the overlapping material images, based on an area of each of the overlapping material images; and performing, via the at least one processor, control processing so that the at least one material image is displayed while being moved within a predetermined range from a barycenter of the at least one material image and so that at least two of the overlapping material images move in different directions from each other.

18. A computer-readable non-transitory storage medium storing a program for causing a computer to execute the following steps:

extracting feature points of a target image by comparing chromatic components of adjacent pixel blocks and setting a pixel block for which an amount of change equal to or larger than a threshold value has been detected as a feature point;

dividing the target image into a plurality of different-sized regions on a basis of the feature points;

changing a size of at least one material image in accordance with an area of a corresponding one of the regions obtained in the dividing step;

placing the at least one material image whose size has been changed in the region, obtained in the dividing step, on a basis of a chromatic component of the region;

determining, in a case where the at least one placed material image comprises a plurality of placed material images and where there is an overlap between the placed material images, an overlap order for outputting the overlapping material images, based on an area of each of the overlapping material images; and outputting the material images in the determined overlap order, wherein each material image has a shape different from a shape of the respective corresponding region into which the material image is placed, and wherein at least one of: (i) the feature points comprise a plurality of discrete points spaced away from each other; and (ii) the feature points are not connected to each other.

19. The computer-readable non-transitory storage medium according to claim 18, wherein the target image is divided on the basis of the feature points with a regional division method in which the feature points are used as generatrices, the regional division method being Voronoi tessellation.

20. A computer-readable non-transitory storage medium storing a program for causing a computer to execute the following steps:

extracting feature points of a target image;

dividing the target image into regions on a basis of the feature points;

changing a size of at least one material image in accordance with an area of a corresponding one of the regions obtained in the dividing step;

placing the at least one material image whose size has been changed in the region, obtained in the dividing step, on a basis of a chromatic component of the region;

determining, in a case where the at least one placed material image comprises a plurality of placed material images and where there is an overlap between the placed material images, an overlap order for outputting the overlapping material images, based on an area of each of the overlapping material images; and performing control processing so that the at least one material image is displayed while being moved within a predetermined range from a barycenter of the at least one material image and so that at least two of the overlapping material images move in different directions from each other.

* * * * *